Oct. 20, 1959   L. J. STERN ET AL   2,909,216
SPRING SEAT
Original Filed Oct. 5, 1953   2 Sheets-Sheet 1

INVENTORS,
LEWIS J. STERN,
BY HARLAN L. DAVIS
Barnes, Kisselle, Laughlin & Raisch
ATTORNEYS Oct. 20, 1959  L. J. STERN ET AL  2,909,216
SPRING SEAT
Original Filed Oct. 5, 1953  2 Sheets-Sheet 2
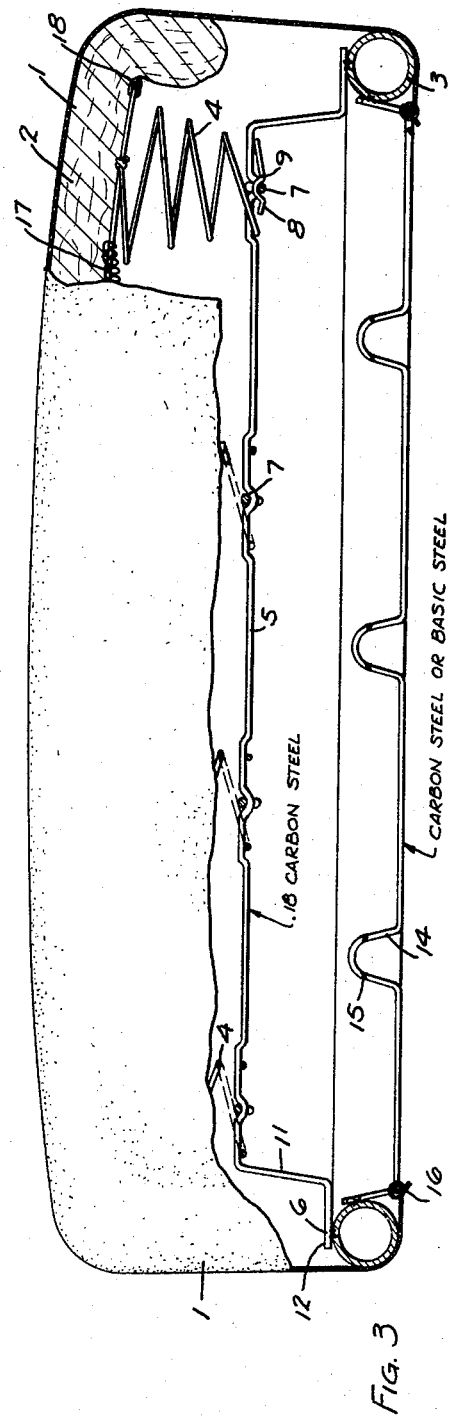
INVENTORS,
LEWIS J. STERN,
BY HARLAN L. DAVIS
ATTORNEYS

United States Patent Office 2,909,216
Patented Oct. 20, 1959

2,909,216
SPRING SEAT

Lewis J. Stern, Adrian, and Harlan L. Davis, deceased, late of Clinton, Mich., by Hildred L. Davis, administratrix, Clinton, Mich., assignors to Stubnitz-Greene Spring Corporation, Adrian, Mich., a corporation of Michigan Continuation of application Serial No. 384,298, October 5, 1953. This application September 3, 1957, Serial No. 681,864

1 Claim. (Cl. 155—179)

This invention relates to seat springs. The objective of automobile manufacturers and body builders in recent years has been to secure a seat spring with minimum depth and great economy in manufacture and assembly. To this end many manufacturers of automobiles have adopted the so-called zig-zag stringer type of spring in place of the hour-glass type of spring that has been used for many years. This zig-zag spring it cheap, but it has many shortcomings, among which are breakage and loss of comfort for the rider. The zig-zag spring supports the rider in hammock-like fashion so that when the limit of stretch is reached in the stringers, there is no yield.

Maurice Stubnitz has undertaken to secure not only economy in manufacture but to do away with the disadvantages of the zig-zag spring by using a double deck spring with coil springs with approximately half the length of the conventional hour-glass type spring. A floating spring wire deck is supported on the seat frame by means of spring wire stringers with loops of the safety pin type at one or both ends. Such a seat spring is described and broadly claimed in the Maurice Stubnitz Patent No. 2,642,292, dated June 23, 1953.

It is the object of our invention to obtain substantially the good qualities of Stubnitz double deck spring, but with much greater economy in manufacture and also economy and ease in installing the wire spring assembly in the seat frame in the body of a car. To this end we propose to build a seat bottom or seat back spring of short conical springs interlaced with stringers which form a mat of carbon steel wire which has properties intermediate between the high carbon spring wire used in spring wire stringers of the prior art and the so-called basic wire. Basic wire is known as 1008 or .08 carbon. Spring wire runs .55 to about .80 carbon. It has lots of spring action but cannot be welded. What I propose is to construct the mat of wire called 1018 which means .18 carbon. This wire can be welded and this enables the wires of the mat to be welded at the intersections, and it also enables the ends of the wire loops which support the mat in elevated position to be welded to the seat frames whether they be tubular, channel, angle or otherwise.

We have found that a spring so designed and so constructed is very economical to manufacture and install. The areas of the mat which are undergoing a load are free to yield in these local areas in such a way as to give the necessary yield and dampening action without the mat yielding as a unit, so that no safety pin type springs are required on one or both ends of the cross stringers, as is the case in the assembly described in the Stubnitz seat spring. This results in considerable saving over the Stubnitz spring by eliminating higher cost spring wire and the safety pin or jack spring type of stringer ends. The manufacturing cost is greatly reduced for the reason that costly and intricate machinery is required to manufacture these stringers with the jack spring ends, as will be apparent by examining the Medendorp application, Serial No. 14,942, filed March 10, 1951. The ends of the stringers that are to be fastened to the seat frame can be formed simply by a punch press operation.

Referring to the drawings:

Fig. 3 is an end view of the seat cushion with the upholstery broken away to show in cross section the seat frame and the wire spring assembly.

Fig. 4 is a fragmentary sectional detail of my seat spring assembly with a seat frame constructed of wire.

Fig. 5 is a similar view showing the assembly with a channel frame.

Fig. 6 is a similar view showing a tubular frame with the stringer feet hooked in place.

Fig. 7 is a fragmentary plan view of the set-up shown in Fig. 6.

1 designates the trimming material for the seat cushion, 2 is the padding, and 3 is the tubular seat frame. The seat assembly has a plurality of short conical load-supporting springs 4. These springs have coils of diminishing diameter and size from top to bottom and consequently these can overlap without any collision and less noise than the conventional type hour-glass springs. The top outer coils by reason of the large diameter, readily yield while the inner or lower coils by reason of a small diameter are much stiffer and will resist when the forces of the load are transferred to the local areas of the mat or deck. A border frame of wire is clipped to the outside coiled springs and small diameter tractile springs tie the springs together at their tops.

Figure 1:
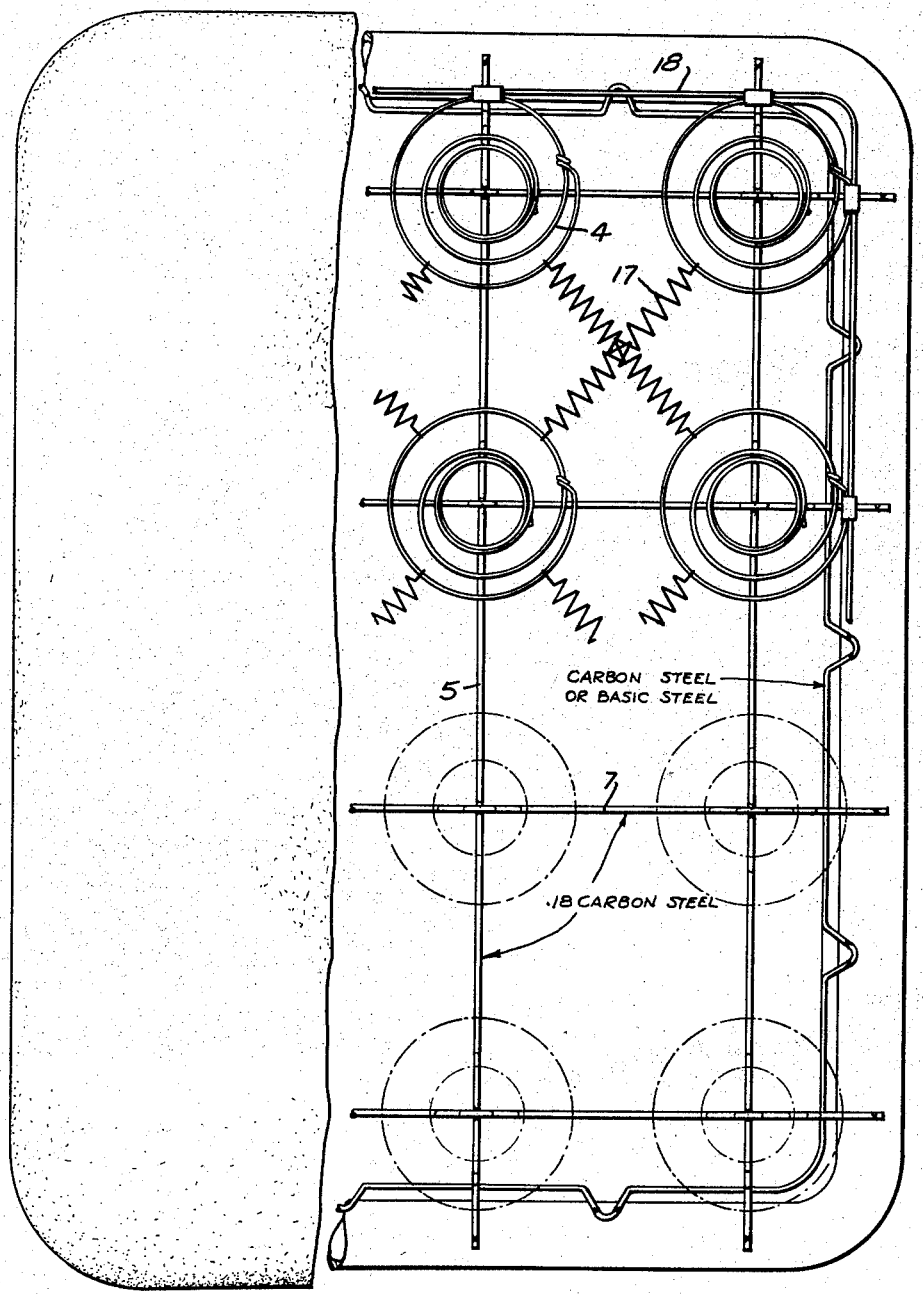
Fig. 1 is a plan view of a seat bottom with the upholstery broken away to afford a plan view of the seat spring.
Figure 2:
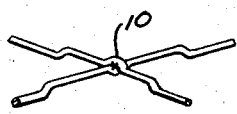
Fig. 2 is a detail showing how the stringers engage at the wire intersections.

The deck is made up of cross stringers 5 constructed as above stated of the 1018 wire which is wire made of steel containing approximately .18 carbon. This wire or steel may be readily spot welded as at 6 to the frame—a tubular frame as shown in Fig. 3, a wire frame as shown in Fig. 4, a channel frame as shown in Fig. 5, or any other type steel frame. The longitudinal stringers are designated 7 and are 1018 steel wire. The coil springs are screwed into the mat at the intersections as shown at 8 in Fig. 3. The end of the coil has a notch 9 pressed into it to snap over the longitudinal stringer 7 and lock the spring in place after it has been screwed in. If it is desired to make a stringer mat without any possibility of the stringers and the carbon coil springs slipping or yielding, the intersecting wires can be spot welded as shown at 10 in Fig. 2.

The legs of the load-supporting cross stringers are designated 11 and the feet 12. The legs and feet form L-shaped ends for the stringers. If it is desired to hook the end of the stringers into the frame as shown in Figs. 6 and 7, the feet 12 have lateral spurs 13 which form Z-shaped feet that can be hooked in holes 14 of the frame.

The assembly shown in Fig. 3, is a very advantageous one. A wire constructed of this .18 carbon steel or basic steel wire is provided with a succession of loops 14. These loops are spot welded at 15 to the frame and this drops the main run of the wire down to the bottom level of the seat frame, but the main run of the wire is spaced from the seat frame; consequently, the trimming material may be drawn under the tubular frame and secured to this drop frame by means of hog rings 16. This whole job makes for a cheap spring wire assembly, an easy and a cheap installation in seat frame, and is cheap and efficient in the fastening of the upholstery under the seat spring assembly and to the seat frame.

The L-shaped legs and feet make an effective spacer of the wire mat or deck from the seat frame but afford little yield. The yield is afforded in the interior of a mat by these 1018 carbon wire stringers that have their greatest yield in the local areas where the pressure of the load is the greatest.

This application is a continuation of application Serial No. 384,298, filed October 5, 1953, now abandoned.

We claim:

A relatively thin spring cushion comprising in combination, a bottom frame defining the external dimensions of said cushion, a deck offset above said frame, said deck being comprised of a plurality of cross stringers and a plurality of longitudinal stringers intersecting said cross stringers, said stringers being formed of relatively soft steel wire having a carbon content far below that of spring steel and in an amount no greater than the order of about 0.18 percent, and deck supporting means defining said offset and including feet on said stringers which may be welded to said frame, a plurality of half-length high-carbon coil springs secured to said deck at said points of intersection, said deck-supporting means being such as to prevent substantial movement of the peripheral edge of said deck toward its center and as to prevent substantial inward deflection of the deck as a whole, the softness of said stringers allowing local deflection of said deck at said points of intersection where pressure is localized by said half coils, as distinguished from bodily movement of the deck as a whole, whereby said cushion combines the high resilience given by the high-carbon coils and the damping effect of said soft steel wire which comprises said deck.

References Cited in the file of this patent

UNITED STATES PATENTS

| | | |
|---|---|---|
| 434,794 | Leggett | Aug. 19, 1890 |
| 853,380 | Stedman | May 14, 1907 |
| 887,111 | McPherson | May 12, 1908 |
| 1,663,001 | Chesley | Mar. 20, 1928 |
| 2,125,519 | Oldham | Aug. 2, 1938 |
| 2,260,954 | Robinson | Oct. 28, 1941 |
| 2,642,929 | Stubnitz | June 23, 1953 |